May 17, 1960  R. F. TUREK ET AL  2,936,583
POSITIVE FEEDBACK ABATEMENT MEANS
Filed Dec. 31, 1958
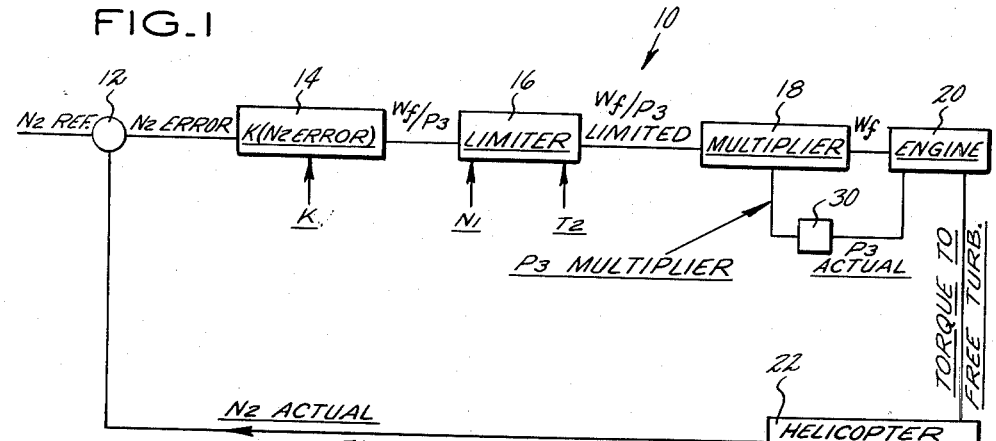
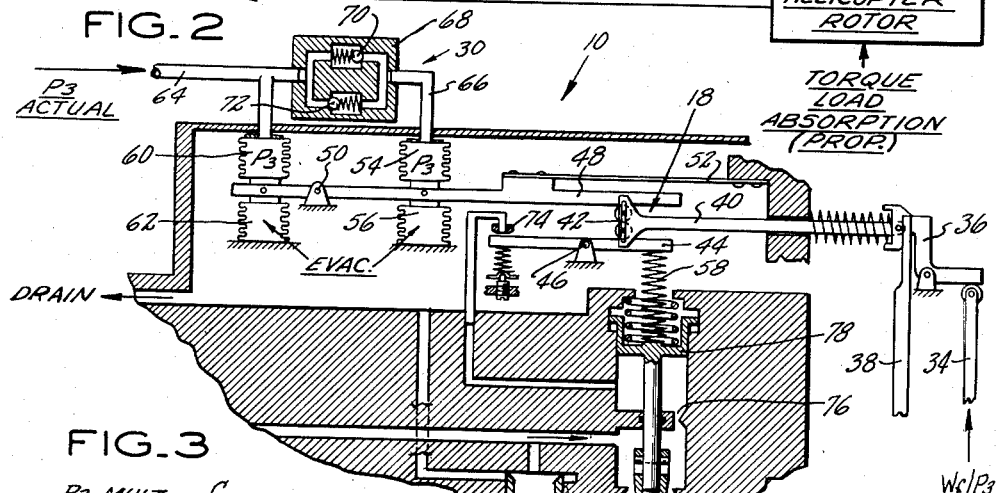
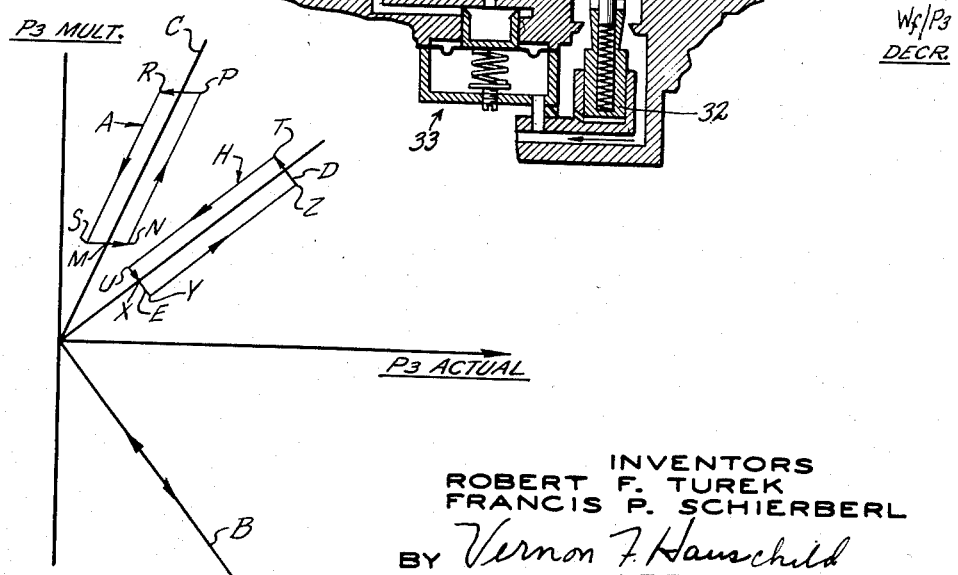
INVENTORS
ROBERT F. TUREK
FRANCIS P. SCHIERBERL
BY *Vernon F. Hauschild*
ATTORNEY

United States Patent Office 2,936,583
Patented May 17, 1960

2,936,583

POSITIVE FEEDBACK ABATEMENT MEANS

Robert F. Turek, Windsor Locks, and Francis P. Schierberl, West Hartford, Conn., assignors to United Aircraft Corporation, East Hartford, Conn., a corporation of Delaware Application December 31, 1958, Serial No. 784,229

9 Claims. (Cl. 60—39.28)

This invention relates to fluid control systems and more particularly to means for abating the effects of positive feedback therein.

It is an object of this invention to teach positive feedback abatement means comprising apparatus effecting the transmission of negative or opposite signals or signal changes, such as parameter changes, in a positive feedback system when the signal change is below a preselected limit while transmitting large signal changes quite accurately.

It is a further object of this invention to teach constant speed powerplant fuel control means comprising a force balance multiplier which is actuated by the signal from two variables, one of which is powerplant output or speed, including a powerplant output or speed feedback from the powerplant to the fuel control means in positive feedback relationship, with provisions for transmitting negative or opposite signals responsive to powerplant ouptut or speed changes to the multiplier when the changes are below a preselected limit while transmitting these changes quite accurately when the changes are substantial.

Other objects and advantages will be apparent from the specification and claims, and from the accompanying drawings which illustrate an embodiment of the invention.

Fig. 1 is a diagrammatic representation of a fluid control means, preferably a fuel control, utilizing our invention.

Fig. 2 is a fragmentary showing of a fluid control means, preferably a fuel control, illustrating a preferred embodiment of our invention.

Fig. 3 is a graphic representation of the effect of our invention upon signal transmission.

Our invention is intended for use primarily in a fuel control system for a free turbine engine, which free turbine is driven by the exhaust gases from the turbojet or main engine turbine and which in turn may drive a helicopter rotor, a turboprop engine propeller, or the like. It is the main function of the fuel control to control the free turbine and hence, for example, the helicopter rotor, at a constant speed designated as $N_2$. Our fuel control regulates the rate of fuel flow, $W_f$, to the engine thereby controlling the engine output so as to maintain speed $N_2$ constant. If free turbine speed $N_2$ falls below the selected or reference speed $N_2$, our fuel control increases the rate of fuel $W_f$ to the engine to increase free turbine speed $N_2$, and vice versa.

A brief description of the fuel control embodying our invention will be given herein and greater particulars with respect thereto may be found in U.S. Patent Nos. 2,857,741, 2,854,818, 2,909,895, and 2,923,128, and the environment will be shown generally in U.S. Patent No. 2,811,324, to which reference may be had.

Since a definite relationship exists between free turbine speed $N_2$ or the error therein and the jet engine parameter $W_f/P_3$, where $W_f$ represents fuel flow to the jet engine, which is preferably of the axially aligned compressor, burner and turbine type described in U.S. Patent Nos. 2,711,631 and 2,747,367, and $P_3$ represents compressor discharge pressure of the jet engine compressor. $P_3$ is indicative of jet engine power output or speed. Our fuel control performs its $N_2$ control function by utilizing engine parameters to perform the calculation ($W_f/P_3$ reference) $\times (P_3$ actual$) = (W_f$ actual$)$.

Referring to Fig. 1 we see a diagrammatic representation of the fuel flow control 10 utilizing our invention. The desired free turbine speed $N_2$ reference is algebraically added to $N_2$ actual at station 12, $N_2$ actual being transmitted thereto from the helicopter rotor, to determine $N_2$ error. $N_2$ error is transmitted to station 14 where it is multiplied by a constan K to calculate the parameter ($W_f/P_3$ reference) which bears a direct relationship to $N_2$ error and is chosen in preference to $W_f$, since it has a more limited range. Due to considerations such as engine surge, engine turbine over-temperature, and combustion chamber flame blowout, it is necessary to establish maximum and minium $W_f/P_3$ limits and such is accomplished by passing parameter ($W_f/P_3$ reference) through station 16 where it is acted upon by jet engine parameter $T_2$ (compressor inlet temperature) and $N_1$ (jet engine turbine speed) to establish these maximum and minimum $W_f/P_3$ limits so that the parameter ($W_f/P_3$ limited) is transmitted from station 16 to multiplier station 18. At station 18, the parameter ($W_f/P_3$ limited) is multiplied by ($P_3$ actual) which is transmitted to station 18 from engine 20, to produce the product ($W_f$ actual), which product is used to regulate fuel flow to engine 20 to drive the free turbine of engine 20 at speed $N_2$. The free turbine of engine 20 is connected directly to helicopter rotor 22 to drive helicopter rotor 22 at speed $N_2$ so that helicopter rotor 22 absorbs the torque of the free turbine of jet engine 20. The speed of the free turbine of engine 20 and hence the speed of helicopter rotor 22 ($N_2$ actual) is transmitted from helicopter rotor 22 to station 12.

It will be noted that station 16, which sends a first signal to multiplier 18 and engine 20 which sends a second signal to multiplier 18 will so connect to multiplier 18 that a change in first signal ($W_f/P_3$ limited) sent to multiplier 18 by station 16 will increase the product ($W_f$ actual) in the same direction as the first signal change. The change in the product ($W_f$ actual) will cause a change in the fuel being provided to engine 20 in this same direction and hence a change in this same direction in the power output of engine 20 so that the ($P_3$ actual) signal sent from engine 20 to multiplier 18 will be changed in this same direction and will cause a second change in the product of multiplier 18 in this same direction. This continued buildup of changes in the same direction, whether increasing or decreasing, is known as a positive feedback and may induce instability in the $N_2$ speed control system unless abated in some fashion.

It is the purpose of our invention to abate this positive feedback system and such will be accomplished by incorporating mechanism at point 30 in the line transmitting the ($P_3$ actual) signal from engine 20 to multiplier 18 which will effect the transmission of opposite or reversed changes in ($P_3$ actual) signal from engine 20 to multiplier 18 when the ($P_3$ actual) signal change is below a preselected limit and which will quite accurately transmit ($P_3$ actual) signal changes, both with respect to intensity and direction, from engine 20 to multiplier 18 when the ($P_3$ actual) signal changes are above this preselected limit. In this fashion, fuel control unit 10 will not be hampered by positive feedback when the changes in ($P_3$ actual) are small yet will be capable of accurately transmitting large ($P_3$ actual) changes.

For purposes of description, the signal transmitted from station 30 of Fig. 1 to multiplier 18 will be designated as ($P_3$ multiplier).

Apparatus for accomplishing our positive feedback abatement function by effecting negative feedback for small signal changes is shown in Fig. 2. Fuel control 10 comprises throttle valve 32 which is positioned by force balance multiplier 18 as a function of the product ($W_f/P_3$ limited) transmitted thereto by movable rod 34 which actuates bell crank 36 as a function of ($W_f/P_3$ reference) as limited by shaft 38 to the parameter ($W_f/P_3$ limited). This last-recited parameter positions bar 40 which carries rolling fulcrum 42 thereon. Rolling fulcrum 42 contacts beam 44 which is pivotable about point 46 and further contacts beam 48 which is pivotable about point 50 and which is held in contact with rolling pivot point 42 by stationary spring 52. The translatory motion imparted to bar 40 as a function of ($W_f/P_3$ limited) in the fashion just described establishes a pressure point on beam 44 at a precise distance from fulcrum point 46. Force is applied at this established pressure point 42 on beam 44 by the action of opposed bellows 54 and 56, which are subjected to ($P_3$ actual) pressure and a vacuum respectively, and opposed bellows 60 and 62 in a manner to be described hereinafter, so that a force proportional to the product of or moment established by the force of the opposed bellows 54 and 56 (and 60—62) through adder bar or beam 48 against beam 44 and the distance between points 42 and 46 on beam 44 is transmitted by multiplier 18 through the servo actuator system consisting of flapper valve 74, fixed orifice 76, piston 78 and feedback spring 58 to position and hence establish the area of throttle valve 32. By the use of bypass means 33, the pressure drop across throttle valve 32 is maintained constant so that the rate of fuel flow therethrough ($W_f$ actual) is a direct function of the position of or area of throttle valve 32, which position or area is determined by the product ($W_f/P_3$ limited) × ($P_3$ mutiplier).

We will now consider the positive feedback abatement means incorporated in control 10, a physical embodiment of which is shown in Fig. 2. Opposed bellows 60 and 62 are placed to act upon beam or adder bar 48 on the opposite side of and closer to fulcrum 50 than opposed bellows 54 and 56 and bellows 60, which is on the same side of beam 48 as is bellows 54, is subjected to ($P_3$ actual) pressure at all times through line 64.

Bellows 62 which is on the same side of beam 48 as is bellows 56, is also evacuated. Accordingly, due to the difference in moment which opposed bellows 54—56 and 60—62 create on beam 48 about fulcrum 50, and assuming that bellows 60 and 54 are both subjected to ($P_3$ actual) pressure, opposed bellows 54 and 56 unit will overcome opposed bellows 60 and 62 unit since it is of greater intensity due to its greater distance from fulcrum 50. During steady state operation, ($P_3$ actual) will be introduced into bellows 60 through line 64 and also into bellows 54 through line 66 so that opposed bellows 54—56, by overruling the effect of opposed bellows 60—62, will be governing the moment imparted to beam 48 and hence governing the ($P_3$ multiplier) signal transmitted from station 30 to multiplier 18. In this fashion, during steady state operation the ($P_3$ actual) signal from engine 20 is transmitted through station 30 to multiplier 18 as ($P_3$ multiplier) pressure very accurately excepting for the pressure drop caused therein by hysteresis mechanism 68 which connects lines 64 and 66 downstream of bellows 60 and upstream of bellows 54. Hysteresis mechanism 68, which preferably comprises opposed or back-to-back check valves 70 and 72 in parallel, serves to prevent the transmission of changes in ($P_3$ actual) pressure to bellows 54, whether the change is an increase or decrease, when the change is below a preselected limit. This preselected limit is determined by the pressure differential at which poppet valves 70 and 72 are set to actuate. As an example, if ($P_3$ actual) pressure in lines 64 and 66 are 60 p.s.i. in steady state condition, then the pressure in line 64 increases to 61 p.s.i., ($P_3$ actual) signal increase will not be sufficient to open poppet valve 72, which is set for illustrative purposes for a one p.s.i. pressure drop actuation, such that the pressure in line 66 and hence bellows 54 remains at 60 p.s.i. It will accordingly be seen that the first pound of pressure buildup in ($m_3$ actual) pressure in line 64 serves to apply a counterclockwise moment on beam 48 around fulcrum 50 by causing opposed bellows unit 60—62 to overcome opposed bellows unit 54—56, this moment being opposite to or the reverse of the positive signal or moment which would be imparted to beam 48 if hysteresis mechanism 68 were not located between lines 64 and 66. This opposite, negative or reverse ($P_3$ multiplier) signal which is transmitted from station 30 to multiplier 18 accomplishes the desirable effect of breaking up the positive feedback chain described previously and substituting a negative feedback chain therefor. As described previously, a positive feedback system occurs when a first signal change in a cycle sets off a series of additive changes in the same direction until the circuit is closed whereupon a change in the same direction will be imparted to the first signal, thereby creating instability within the system. A negative feedback system differs from a positive feed-back system in that at least one of the signal changes which occurs in the cycle is in the reverse or opposite direction to the remainder of the signal changes, thereby reducing, eliminating or overcoming the cumulative unidirectional buildup.

When the ($P_3$ actual) pressure in line 64 exceeds the pressure in line 66 by an amount greater than one p.s.i., check valve 72 will open permitting the entry of ($P_3$ actual) pressure from line 64 into line 66 and to come within one p.s.i. of ($P_3$ actual). Once check valve 72 opens, opposed bellows 54—56 are again in control, overpowering bellows 60—62 and again dictate the ($P_3$ multiplier) signal imparted by beam 48 to multiplier 18. If ($P_3$ actual) signal should reduce in line 64, poppet valve 72 will close and when the pressure difference between lines 64 and 66 becomes greater than one p.s.i., check valve 70, which is also set for a one p.s.i. pressure drop actuation, will open and release the pressure in line 66 and bellows 54 to line 64. Accordingly, when ($P_3$ actual) pressure diminishes in line 64, a negative feedback signal is again imparted to beam 48 since the moment acting upon beam 48 by bellows 60—62 reduces while the moment acting upon beam 48 by bellows 54—56 does not reduce and hence, while ($P_3$ actual) pressure is reducing, a reverse or negative signal is being imparted to multiplier 18 through beam 48 indicative of ($P_3$ actual) pressure increase. Once check valve 70 is open, the pressure in bellows 54 is released to line 64 such that it remains one p.s.i. thereabove.

Fig. 3 illustrates the effect which the positive feedback abatement mechanism, at station 30, has upon ($P_3$ multiplier) signal transmitted from station 30 to multiplier 18. If ($P_3$ actual) pressure acted upon bellows 60—62 only, that is, if bellows 54—56 were removed from the Fig. 2 embodiment, a plot of ($P_3$ multiplier) pressure against ($P_3$ actual) pressure would proceed along line B in Fig. 3, in a negative direction since bellows 60—62 are on the opposite or reverse signal imparting side of fulcrum 50. If bellows 54—56 only acted upon beam 48, that is if bellows 60—62 were removed from our Fig. 2 configuration, and if ($P_3$ actual) did not pass through hysteresis mechanism 68 in being transmitted to bellows 54, the plot of ($P_3$ multiplier) vs. ($P_3$ actual) would be along line C in Fig. 3, which is of a steeper slope since bellows 54—56 are a greater distance from fulcrum 50 than the their opposing bellows unit 60—62 and plot C is in a positive direction, as opposed to plot B's negative direction since bellows 54—56 are on the opposite or positive signal side of fulcrum 50 from bellows 60—62. Assuming that ($P_3$ actual) passes through hysteresis mechanism 68 in getting to bellows 54, the plot of ($P_3$ multiplier) pressure vs. ($P_3$ actual) pressure would be as shown by polygon A in Fig. 3 in which, assuming steady state operation pressure ($P_3$ actual)

and ($P_3$ multiplier) will be equal at 60 p.s.i. at point M. As ($P_3$ actual) increases one p.s.i. to point N, ($P_3$ multiplier) will not increase due to the preventive action of poppet valve 72. At point N, ($P_3$ actual) is 61 p.s.i. and ($P_3$ multiplier) is 60 p.s.i. As ($P_3$ actual) increases beyond one p.s.i., poppet valve 72 will open and ($P_3$ actual) and ($P_3$ multiplier) will continue to increase from point N to point P, at the same rate or slope as plot C so that at point P, ($P_3$ multiplier) is 69 p.s.i. and ($P_3$ actual) is 70 p.s.i. If at point P, ($P_3$ actual) decreases, ($P_3$ multiplier) will be unaffected thereby since poppet valve 72 will close and poppet valve 70 will open when the pressure drop thereacross exceeds one p.s.i. so that at point R, ($P_3$ multiplier) will be 69 p.s.i. while ($P_3$ actual) will be 68 p.s.i. As ($P_3$ actual) reduces further, ($P_3$ multiplier) will also reduce so that the plot follows from point R to point S, at the same slope as plot C. At point S, ($P_3$ multiplier) will be 60 p.s.i. and ($P_3$ actual) 59 p.s.i. Adding plot B and polygon plot A algebraically, in the same fashion that the signals, forces or moments imparted by bellows units 54—56 and 60—62 are added algebraically about fulcrum point 50, we arrive at polygon plot H which has negative signal or negative feedback signal along slopes D and E which is the same slope as plot B. Again assuming steady state operation at point X, ($P_3$ actual) and ($P_3$ multiplier) will be equal. As ($P_3$ actual) increases one p.s.i., ($P_3$ multiplier) will decrease to point Y, hence a negative signal or a negative feedback signal is obtained. As ($P_3$ actual increases further, ($P_3$ multiplier) will increase therewith but at a lesser but constant value to point Z. If at point Z, ($P_3$ actual) decreases, ($P_3$ multiplier) will increase to point T, thereby giving a negative feedback signal. As ($P_3$ actual) decreases further, ($P_3$ multiplier) will decrease therewith but will remain at a constant value higher than ($P_3$ actual) from point T to point U.

It is to be understood that the invention is not limited to the specific embodiment herein illustrated and described but may be used in other ways without departure from its spirit as defined by the following claims:

We claim:

1. In a fluid control system, a fluid flow metering valve, a multiplier to position said valve, first means transmitting changes in a first signal to said multiplier, second means transmitting changes in a second signal to said multiplier when said second signal changes exceed a predetermined value, and third means opposing and of lesser intensity than said second means transmitting changes in said second signal to said multiplier at all times.

2. In a fluid control system, a fluid flow metering valve, a multiplier comprising a beam pivotable about a fulcrum to position said valve, first means transmitting changes in a first signal to said multiplier, second means transmitting changes in a pressure signal to said multiplier and comprising opposed bellows on opposite sides of said beams the first of which is subjected to said pressure signal changes when said pressure signal changes are above a predetermined value and the second of which is evacuated, and third means comprising opposed bellows on opposing sides of said beam and on the opposite side of and closer to said fulcrum than the bellows of said second means and having a first bellows on the same side of said beam as said first bellows of said second means which is subjected to said pressure signal changes at all times and a second bellows which is evacuated.

3. In a fluid control system, a fluid flow metering valve, a multiplier to position said valve, first means transmitting changes in a first signal to said multiplier, second means controlled as a function of said valve position and transmitting changes in a second signal to said multiplier, means preventing the transmitting of changes in said second signal to said multiplier when said second signal changes are below a predetermined limit and third means opposing and of lesser intensity than said second means transmitting changes in said second signal to said multiplier at all times.

4. In a fluid control system including a multiplier, first means transmitting changes in a first signal to said multiplier, second means transmitting changes in a second signal to said multiplier to be multiplied thereby by said first signal to produce the product thereof, said second means actuated by said product to produce said second signal, said first and second means being so connected that an increase in said first signal increases said product and an increase in said product increases said second signal to again increase said product thereby establishing a positive feedback, means preventing the transmitting of changes in said second signal to said multiplier when said second signal changes are below a predetermined limit, and third means opposing and of lesser intensity than said second means transmitting changes in said second signal to said multiplier at all times.

5. In a fluid control system including a multiplier comprising a beam pivotable about a fulcrum, first means transmitting changes in a first signal to said multiplier, second means transmitting changes in a pressure signal to said multiplier in the form of a force imparted to said beam by a first bellows subjected to said pressure signal and opposed by an evacuated bellows to be multiplied thereby by said first signal to produce the product thereof, said second means actuated by said product to produce said pressure signal, said first and second means being so connected that an increase in said first signal increases said product and an increase in said product increases said pressure signal to again increase said product thereby establishing a positive feedback, means preventing the transmitting of changes in said second signal to said multiplier when said second signal changes are below a predetermined limit, and third means comprising opposed bellows on opposite sides of said beam and on the opposite side of and closer to said fulcrum than the bellows of said second means and having a first bellows on the same side of said beam as said first bellows of said second means which is subjected to said pressure signal changes at all times and a second bellows which is evacuated.

6. An engine, a control system providing fuel to said engine including a fuel flow metering valve, a multiplier producing the product of two signals and positioning said valve as a function of said product thereby regulating the flow of fuel to said engine and hence the power output of said engine as a function of said product, first means transmitting a first of said two signals to said multiplier, second means transmitting a second of said two signals in the form of an engine power output signal to said multiplier, said engine, said control system and said second signal means connected to establish a positive feedback so that a change in said first signal changes said product in the same direction, which changes said second signal in the same direction, which changes said product again in the same direction, means preventing the transmitting of changes in said second signal to said multiplier when said second signal changes are below a predetermined limit, and third means opposing and of lesser intensity than said second means transmitting changes in said second signal to said multiplier at all times.

7. An engine in combination with a constant speed control system comprising means to meter fuel to said engine as a function of the product of two variables one of which is indicative of engine speed error, first means to transmit a first signal proportional to engine speed error to said fuel metering means, second means to transmit a second signal to said fuel metering means to be multiplied thereby by said first signal to produce the product of said two variables and meter fuel to said engine as a function of said product, said first and second means connected to said fuel metering means and said fuel metering means connected to said engine so that a change in said first signal causes a change in said product in the same direction, which product change causes a change in said second signal in the same direction, which second signal change causes a second increase in said product in the same direction thereby establishing a positive feedback system, means preventing the transmitting of changes in said second signal to said multiplier when said second signal changes are below a predetermined limit, and third means opposing and of lesser intensity than said second means transmitting changes in said second signal to said multiplier at all times.

8. An engine comprising a compressor, burner and turbine in axial alignment in combination with a constant speed control system comprising means to meter fuel to said engine including a valve and means to maintain the pressure drop thereacross constant and a multiplier to control the area thereof as a function of the product of two variables indicative of engine speed error one of which variables is engine compressor discharge pressure, first means to transmit a first signal proportional to one of said two variables to said multiplier, second means to transmit a second signal proportional to engine compressor discharge pressure to said multiplier to be multiplied thereby by said first signal to produce the product of said two variables and position said valve to meter fuel to said engine as a function of said product, said first and second means connected to said fuel metering means and said fuel metering means connected to said engine so that a change in said first signal causes a change in said product in the same direction, which product change causes a change in said engine compressor discharge pressure signal in the same direction, which engine compressor discharge pressure signal change causes a second increase in said product in the same direction thereby establishing a positive feedback system, means preventing the transmitting of changes in said second signal to said multiplier when said second signal changes are below a predetermined limit, and third means opposing and of lesser intensity than said second means transmitting changes in said second signal to said multiplier at all times.

9. An engine comprising a compressor, burner and turbine in axial alignment in combination with a constant speed control system comprising means to meter fuel to said engine including a valve and means to maintain the pressure drop thereacross constant and a multiplier including a valve and means to maintain the pressure drop thereacross constant and a multiplier including a beam pivotable about a fulcrum to control the area thereof as a function of the product of two variables indicative of engine speed error one of which variables is engine compressor discharge pressure, first means to transmit a first signal proportional to one of said two variables to said multiplier, second means to transmit a second signal proportional to engine compressor discharge pressure to said multiplier to be multiplied thereby by said first signal to produce the product of said two variables and position said valve to meter fuel to said engine as a function of said product, said second means comprising opposed bellows on opposite sides of said beam the first of which is subjected to said second signal and the second of which is evacuated said first and second means connected to said fuel metering means and said fuel metering means connected to said engine so that a change in said first signal causes a change in said product in the same direction, which product change causes a change in said engine compressor discharge pressure signal in the same direction, which engine compressor discharge pressure signal change causes a second increase in said product in the same direction thereby establishing a positive feedback system, means preventing the transmitting of changes in said second signal to said multiplier when said second signal changes are below a predetermined limit, and third means comprising opposed bellows on opposite sides of said beam and on the opposite side of and closer to said fulcrum than the bellows of said second means and having a first bellows on the same side of said beam as said first bellows of said second means which is subjected to said pressure signal changes at all times and a second bellows which is evacuated.

References Cited in the file of this patent
UNITED STATES PATENTS

| | | |
|---|---|---|
| 2,481,395 | Carns | Sept. 6, 1949 |
| 2,857,741 | Evers | Oct. 28, 1958 |

UNITED STATES PATENT OFFICE

CERTIFICATE OF CORRECTION

Patent No. 2,936,583 May 17, 1960

Robert F. Turek et al.

It is hereby certified that error appears in the printed specification of the above numbered patent requiring correction and that the said Letters Patent should read as corrected below.

Column 5, line 61, for "opposing" read -- opposite --.

Signed and sealed this 18th day of October 1960.

(SEAL)
Attest:
KARL H. AXLINE
Attesting Officer

ROBERT C. WATSON
Commissioner of Patents